US010674318B2

(12) United States Patent
Kennedy

(10) Patent No.: US 10,674,318 B2
(45) Date of Patent: Jun. 2, 2020

(54) SYSTEMS AND METHODS FOR LOCATION TRACKING AND MONITORING WITHIN A SECURED AREA

(71) Applicant: Exponential Innovative Technology & Gaming Company, LLC, Milwaukee, WI (US)

(72) Inventor: Alvernest Kennedy, Milwaukee, WI (US)

(73) Assignee: EXPONENTIAL INNOVATIVE TECHNOLOGY & GAMING COMPANY, LLC, Milwaukee, WI (US)

( * ) Notice: Subject to any disclaimer, the term of this patent is extended or adjusted under 35 U.S.C. 154(b) by 0 days.

(21) Appl. No.: 16/244,357

(22) Filed: Jan. 10, 2019

(65) Prior Publication Data

US 2019/0268724 A1    Aug. 29, 2019

Related U.S. Application Data

(60) Provisional application No. 62/635,250, filed on Feb. 26, 2018.

(51) Int. Cl.
*H04W 4/029* (2018.01)
*H04W 4/80* (2018.01)
*G06K 9/00* (2006.01)
*H04W 4/38* (2018.01)

(52) U.S. Cl.
CPC ........ *H04W 4/029* (2018.02); *G06K 9/00771* (2013.01); *H04W 4/38* (2018.02); *H04W 4/80* (2018.02)

(58) Field of Classification Search
None
See application file for complete search history.

(56) References Cited

U.S. PATENT DOCUMENTS

| 2009/0309732 | A1* | 12/2009 | Truscott | G08B 13/06 340/572.1 |
| 2011/0314153 | A1* | 12/2011 | Bathiche | H04L 63/08 709/225 |
| 2015/0350362 | A1* | 12/2015 | Pollack | H04L 67/2861 709/217 |
| 2016/0004914 | A1* | 1/2016 | Park | H04N 7/188 382/209 |
| 2018/0295428 | A1* | 10/2018 | Bi | H04N 21/2187 |

* cited by examiner

*Primary Examiner* — Christopher Braniff
(74) *Attorney, Agent, or Firm* — Husch Blackwell LLP

(57) ABSTRACT

Systems and methods for location tracking and monitoring within a secured area are provided. Such systems and methods can include capturing real-time surveillance data with a plurality of surveillance devices deployed in the secured area and transmitting the real-time surveillance data to a local control unit proximate to the secured area. Contemporaneously, a dual mode location tracker can generate first and second location data indicative of a location of the dual mode location tracker within the secured area over a period of time using respective first and second tracking modes and transmit the first location data and the second location data to the local control unit. In some embodiments, the local control unit can forward the real-time surveillance data, the first location data, and the second location data to a remote server for storage, analysis, and processing.

19 Claims, 2 Drawing Sheets

SYSTEMS AND METHODS FOR LOCATION TRACKING AND MONITORING WITHIN A SECURED AREA

CROSS REFERENCE TO RELATED APPLICATIONS

This application claims priority to U.S. Provisional Patent Application No. 62/635,250 filed Feb. 26, 2018 and titled "AERONAUTIC CHECKS AND BALANCES ACCOUNTABILITY TRACKING SYSTEM AND RELATED COMPONENTS, ASSEMBLIES AND METHODS OF USE." U.S. Provisional Patent Application No. 62/635,250 is hereby incorporated by reference.

FIELD OF THE DISCLOSURE

The present disclosure relates generally to location tracking and monitoring. More specifically, the present disclosure relates to location tracking and monitoring of a secured area such as a construction site and systems and methods for combining the results from the location tracking of users, devices, or objects within the secured area and the monitoring of the secured area into comprehensive reports about the composition of workers and the activity taking place at the construction site over some specified time period.

BACKGROUND

Some systems and methods for monitoring a secured area and tracking users, devices, or objects within the secured area are known. However, such known systems and methods suffer from several flaws. For example, such systems and methods typically employ only a single method of location tracking which lacks robustness and may be prone to failure. Additionally, such known systems and methods are not capable of generating comprehensive reports documenting the composition of workers and the activity taking place at the construction site over some specified time period. These comprehensive reports can be especially useful given that the federal government and state and local governments have various requirements when it comes to government sponsored or government funded construction jobs. For example, many government entities require construction firms or contractor employ a certain percentage of employees considered minorities, to requiring a certain percent of the total work to be completed by minority-owned contractors. Many government entities also require a form of accountability to ensure contractors (minority or otherwise) are not taking advantage of inefficient staffing and/or inefficient project management. Further, on the contractor level, contractors also need to keep track of employees while on the job to ensure the government quotas are met. Contractors must also locate minority employees and minority contractors to fulfill any quotas if the contractor arrangement and/or employee arrangement changes. Keeping track of contractors, employees and productivity using the known systems and methods can be difficult.

In view of the above, there is a continuing, ongoing need for improved systems and methods.

SUMMARY

The present disclosure provides an aeronautic checks and balances accountability tracking system.

The present disclosure provides a method of monitoring a construction site.

The present disclosure provides a method of managing employees, contractors and/or firms.

The present disclosure provides a system for monitoring a construction site.

The present disclosure provides a system for managing employees, contractors and/or firms.

The present disclosure provides a system that includes a local control unit deployed proximate to a secured area. The system can also include a remote server removed from the secured area that communicates with the local control unit over a wide area network. The system can also include a plurality of surveillance devices deployed within the secured area that capture real-time surveillance data and transmit the real-time surveillance data to the local control unit. The system can also include at least one location tracker that generates first location data indicative of a location of the at least one dual mode location tracker within the secured area over a period of time using a first tracking mode. The at least one location tracker can transmit the first location data and an identifier of the location tracker to the local control unit. The local control unit can forward the real-time surveillance data, the first location data, and the identifier of the location tracker to the remote server for storage, analysis, and processing.

The present disclosure provides a method including capturing real-time surveillance data with a plurality of surveillance devices deployed in a secured area. The method can also include transmitting the real-time surveillance data to a local control unit proximate to the secured area. The method can also include at least one location tracker generating first location data indicative of a location of the at least one location tracker within the secured area over a period of time using a first tracking mode. The method can also include the at least one location tracker transmitting the first location data and an identifier of the at least one location tracker to the local control unit. The method can also include the local control unit forwarding, over a wide area network, the real-time surveillance data, the first location data, and the identifier of the at least one location tracker to a remote server for storage, analysis, and processing, the remote server including a web server for interfacing with a third party device and at least one backend server isolated from the web server by a firewall. The method can also include the backend server storing, analyzing, and processing the real-time surveillance data and the first location data.

BRIEF DESCRIPTION OF THE DRAWINGS

Embodiments of the systems and methods for location tracking and monitoring within a secured area as disclosed herein and related components and assemblies are disclosed with reference to the accompanying drawings and are for illustrative purposes only. The systems and methods for location tracking and monitoring within a secured area as disclosed herein and the related components and assemblies are not limited in application to the details of construction, arrangement of components or methods illustrated in the drawings. The systems and methods for location tracking and monitoring within a secured area as disclosed herein and the related components and assemblies can be capable of other embodiments or of being practiced or carried out in other various ways. Like reference numerals are used to indicate like components. In the drawings.

DETAILED DESCRIPTION

Figure 1:
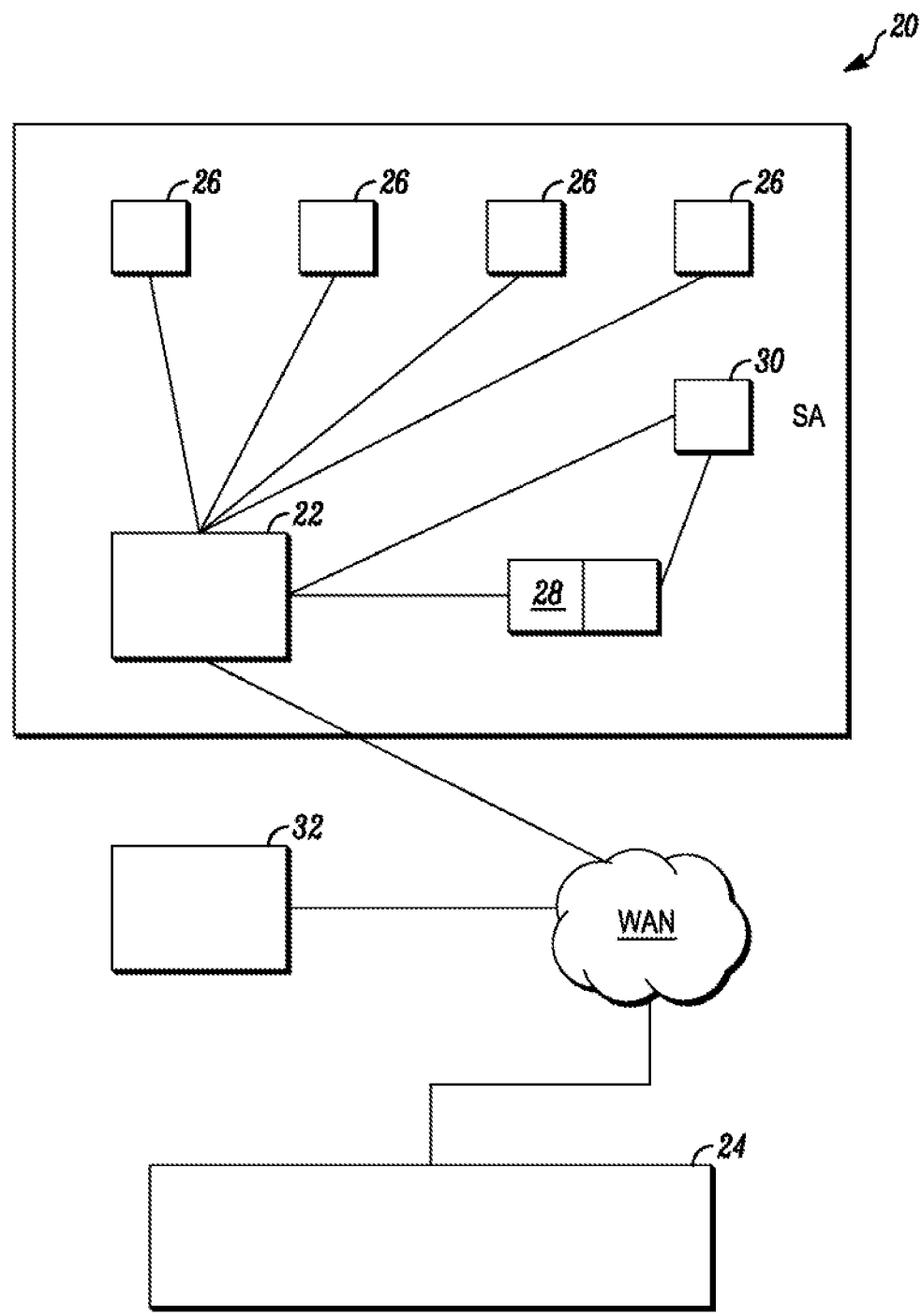
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

FIG. 1 is a block diagram of a system 20 in accordance with disclosed embodiments. As seen in FIG. 1, the system 20 can include a local control unit 22, a remote server 24, a plurality of surveillance devices 26, a location tracker 28, a tracking beacon 30, and a third party device 32 (e.g. a user device, a computer, a PDA, a mobile phone, a smart phone, etc.). As seen in FIG. 1 the local control unit 22, the plurality of surveillance devices 26, the location tracker 28, and the tracking beacon 30 can be deployed in a secured area SA and can communicate with each other using wired and wireless means known to a person having ordinary skill in the art. The remote server 24 and the third party device 32 can communicate with the local control unit 22 over a wide area network WAN such as the internet. In some embodiments, the remote server 24 and the third party device 32 can communicate with the local control unit 22 using a secure channel such as an SSL or VPN connection.

The local control unit 22 can include various devices for facilitating and managing communication of data among the devices deployed at the secured area SA. Such devices include but are not limited to a computer, a server, a control panel, a microcontroller, and a microprocessor. The plurality of surveillance devices 26 can include devices that monitor the secured area SA and, in some embodiments, can produce real-time surveillance data that can include one of live video or periodic still images. In some embodiments, a first group of the plurality of surveillance devices 26 can include first cameras mounted on drones that patrol the secured area SA and a second group of the plurality of surveillance devices 26 that can include second cameras mounted at fixed locations throughout the secured area SA.

In some embodiments, the location tracker 28 can include a dual mode location tracker comprising a single housing that includes one or more transceiver devices and one or more memory devices, each of which can be in communication with control circuitry, one or more programmable processors, and executable control software as would be understood by one of ordinary skill in the art to facilitate operation of both a first tracking mode and a second tracking mode. In some embodiments, the first tracking mode and the second tracking mode can operate simultaneously. In some embodiments, one or both of the first tracking mode and the second tracking mode can be emulated by an application running on a mobile device.

In some embodiments, the tracking beacon 30 can be deployed at a known location within the secured area and can include at least one transceiver device and accompanying control systems as would be understood by one of ordinary skill in the art for interfacing with one of the tracking modes of the dual mode location tracker 28. For example, in some embodiments, the tracking beacon 30 can include one half of radio frequency identification (RFID) or near filed identification (NFID) equipment known in the art. In some embodiments, multiple instances of the tracking beacon 30 can be deployed throughout the secured area SA.

In operation, in some embodiments, the plurality of surveillance devices 26 can capture real-time surveillance data of the secured area SA and transmit the real-time surveillance data to the local control unit 22. In some embodiments, the local control unit 22 sets or defines a boundary of the secured area SA based on user input received by the local control unit 22. In some embodiments, the user input setting the boundary can be received by the third party device 32 and forwarded to the local control unit 22. In these embodiments, the local control unit 22 can direct each of the plurality of surveillance devices 26 to capture the real-time surveillance data within the boundary of the secured area SA.

Contemporaneously, the location tracker 28 can move about the secured area SA, generate first location data indicative of a location of the location tracker 28 within the secured area SA over a period of time using the first tracking mode, and generate second location data indicative of the location of the at least one dual mode location tracker within the secured area over the period of time using the second tracking mode. The location tracker 28 can generate the first and second location data by providing information to other devices in the system 20, receiving information from other devices in the system 20, or receiving information from devices outside the system 20 such as the global positioning system. In some embodiments, the first location data can include GPS data and the second location data can include RFID activation data with respect to the tracking beacon 30. In some embodiments, the first tracking mode can continuously monitor and record the location of the location tracker during the period of time and the second tracking mode can periodically monitor and record the location of the location tracker 28 when, during the period of time, the location tracker 28 is within range of the tracking beacon 30. Additionally or alternatively, the first tracking mode can periodically monitor the location of the location tracker 28 during the period of time at a first rate set by receiving user input at the local control unit 22, the third party device 32, or the location tracker 28. In some embodiments, the location tracker 28 can include a single mode location tracking device that performs one of the first tracking mode or the second tracking mode.

The location tracker 28 can transmit one or both of the first location data and the second location data to the local control unit 22 as each data point of the first location data and the second location data is recorded or after expiration of the period of time. In some embodiments, the period of time corresponds to a scheduled work period for a user assigned to the dual mode location tracker 28. The local control unit 22 can forward the real-time surveillance data, the first location data, and the second location data to the remote server 24 for storage, analysis, and processing. The local control unit 22 can forward the data as it is received or as a bulk transmission at a designated time. In some embodiments, the location tracker 28 can transmit an identifier of the location tracker 28 to the control unit 22 with the first location data and the second location data.

In some embodiments, the third party device 32 can receive user input selecting a group of the plurality of surveillance devices 26 and can transmit a request to the local control unit 22 for a live transmission of the real-time surveillance data from the group of the plurality of surveillance devices 26. In response, the control unit 22 can transmit the real-time surveillance data from the group of the plurality of surveillance devices 26 as they are viewed and recorded directly to the third party device 32. In some embodiments, the group of the plurality of surveillance devices 26 can include a single one of the plurality of surveillance devices 26.

In some embodiments, the remote server 24 can integrate one or both of the first location data and the second location data with portions of the real-time surveillance data captured at the location of the location tracker 28 over the period of time. Additionally, in some embodiments, the remote server 24 can generate a report documenting the location of the location tracker 28 over the period of time in response to received user input. In some embodiments, the user input requesting the report can be received at and sent from the third party device 32. In some embodiments, the remote server 24 can include or incorporate demographic information of an assigned user of the location tracker 28 that is stored in a database of the remote server in the report. In some embodiments, the remote server 24 can identify the demographic information using the identifier of the location tracker 28. In some embodiments, the remote server 24 can include a web server for interfacing with the third party device 32 and at least one backend server that stores, analyzes, and processes the real-time surveillance data, the first location data, and the second location data as described herein. In some embodiments, the web server can be isolated from the at least one backend server by a firewall.

Figure 2:
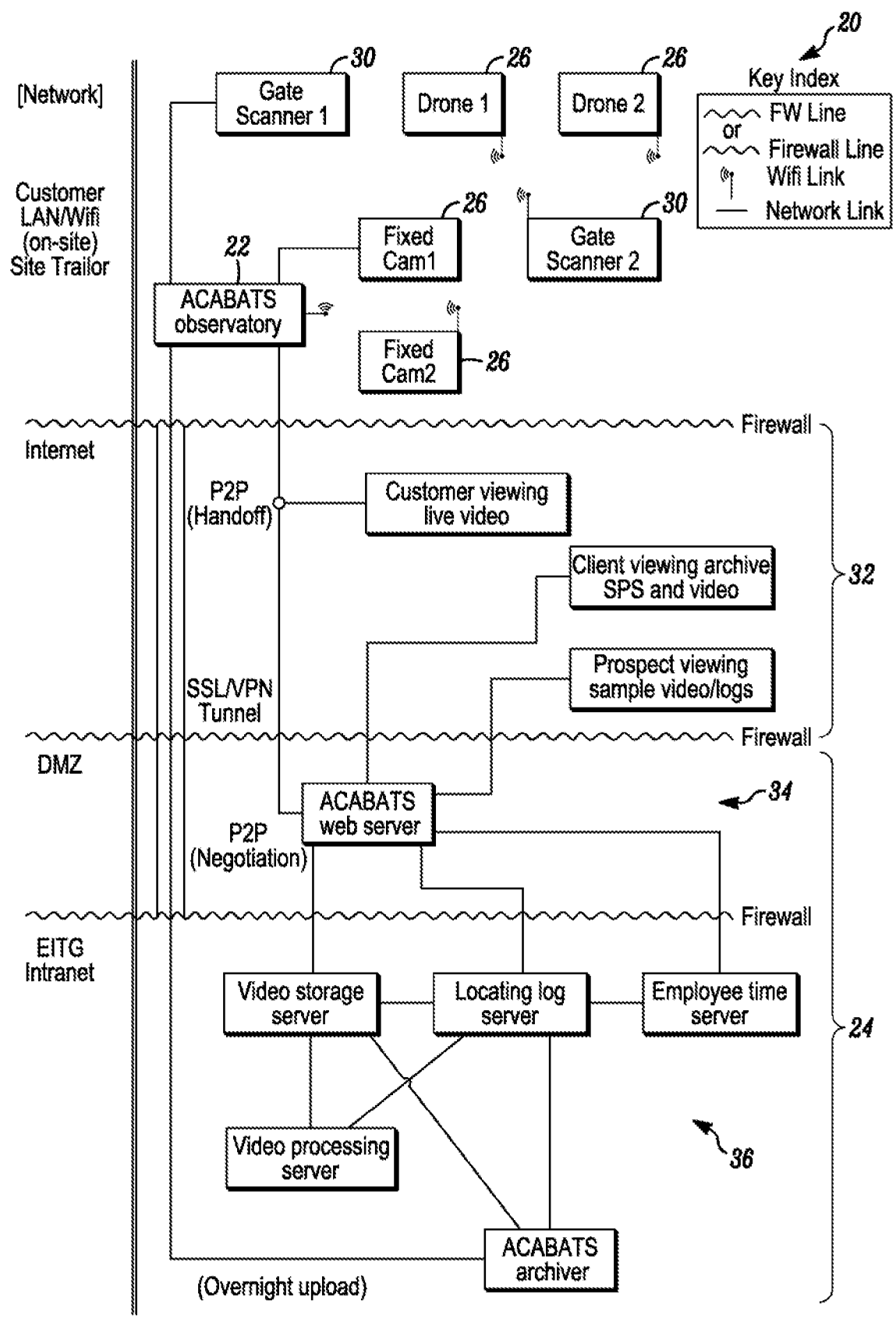
FIG. 2 is a network diagram of an embodiment of the system in accordance with disclosed embodiments.

FIG. 2 is a network diagram of an embodiment of the system 20. Specifically. FIG. 2 shows the system 20 as an aeronautic checks and balances accountability tracking system (ACABATS), in which the local control unit 22 can be embodied as an ACABATS observatory; the plurality of surveillance devices 26 can include drones and fixed cameras; tracking beacon 30 can include first and second gate scanners; and the remote server 24 can include a web server 34 and a backend server 36. As seen in FIG. 2, in some embodiments, the backend server 24 can include a video storage server, a location log server, a video processing server, and ACABATS archiver, and an employee time server that can perform the functions described herein and be arranged in any combination of discrete or interconnected components as would be known by those having skill in the art.

Additionally, the location tracker 28 can be embodied as an ACABAND. In some embodiments, the ACABAND can include a GPS and RFID enabled wristband the size of a bracelet, cuff, or smaller with a rechargeable battery. In some embodiments, the ACABAND can also be equipped with Bluetooth. In some embodiments, each ACABAND can be associated with assigned user information such as an employee's identification information (e.g., name, address, employee ID number, driver's license number, phone number, email address, job title/description, job plan for a given day, certifications, etc.), medical information (e.g., known health conditions relevant to job, emergency contact information, etc.), or any other information required by an employer and/or volunteered by an employee. Such information can be stored directly on the ACABAD itself, the ACABATS observatory 22, and/or the remote server 24. In an embodiment, such as, for example, if an employee forgets the ACABAND, a temporary downloadable application may be installed in on a portable electronic device (e.g., laptop, PDA, GPS system, etc.) or any similar portable communications device (e.g., smart phone) while the ACABAND is unavailable. The downloadable application can emulate at least some of the features of the ACABAND.

The ACABATS system 20 relates particularly to use in the field of construction project management and has at least the following specific characteristics. The ACABATS system 20 can establish construction project work area boundaries for a subscriber and/or the user/subjects (e.g., a subscriber company and its users/employees/equipment/etc.) using the ACABATS observatory 22. The ACABATS system 20 can monitor the user, employee, or equipment within the defined boundaries with a combination of one or more ACABANDS, dedicated GPS trackers (e.g., high frequency antenna connected to a scanner), dedicated radio frequency identification (RFID) tags, mounted cameras (e.g., high resolution and/or wireless cameras capturing video and/or still images), and/or drones which may carry canmeras (e.g., high resolution and/or cameras capturing video and/or still images). In some embodiments, live streaming of still images or video footage captured by the cameras (whether mounted or on drones) may be streamed live to the third party device 32 where the still images or video footage can be viewed by a supervisor, subscriber or other customer.

In some embodiments, the ACABATS system 20 can be used by an authorized subscriber. The subscriber will have access to a unique instance of the ACABATS system 20, such as, for example, with a unique login and/or identifier to access any hosted contact (e.g., streamed footage) and/or access information collected by the ACABATS system 20 (e.g., employee check-ins. GPS and/or RFID information, still and/or video footage obtained from cameras, drone locations, etc.) and associated with the subscriber. In such embodiments, the subscriber can set up the boundary lines/area controlled by the ACABATS observatory 22, input employee information, and select and/or approve locations for mounting cameras, RFID scanner and/or other monitoring equipment all through the third party device 32.

In some embodiments, the dedicated RFID tags or those integrated into the ACABANDS can include an extended-range battery-boosted RFID tag. In some embodiments, the dedicated RFID tags may be embedded on an insignia, bracelet, necklace and/or installed in a vehicle (e.g., a vehicle interface system). An RFID tag may be identified by drones, portable and/or mounted scanners, and/or the cameras (still and/or video).

In some embodiments, one or more drones are used with the ACABATS system 20. The one or more drones can include an onboard computer and a camera, preferably a video camera such as a high resolution wireless camera. The one or more drones may also include a GPS receiver to identify the location of the one or more drones or the employees having either the dedicated GPS-enabled device (e.g., insignia, bracelet, necklace, etc.) or the ACABAND as described herein. In some embodiments, the one or more drones has the ability to upload data obtained (e.g., camera footage whether still or video, employee location, etc.) to the remote server 24 either directly or through the ACABATS observatory 22. The remote server 24 can handle the processing of any notification resulting from the information, data analysis, and distribution of living-streaming video content if available.

In some embodiments, one or more cameras are used with the ACABATS system 20. The cameras may record still photographs or video footage, and are preferably video cameras. Cameras may be mounted or, as mentioned above, attached to a drone. In some embodiments, the ACABATS system 20 can include one or more mounted high-resolution video cameras which are capable of wirelessly connecting to the internet. Footage from one or more of the cameras may be broadcast or live-streamed and/or sent to a back-up server for temporary, short-term or long-term storage and/or data processing. In some embodiments, the recorded footage may be processed to identify employees in view and notifications may be automatically generated based on the data obtained from the footage.

In some embodiments, the ACBATS observatory 22 can monitor information such as employee check-ins at the gate scanners 30; GPS and/or RFID information from the ACA-BANDS, the dedicated GPD devices, and/or the dedicated RFID devices; still and/or video footage obtained from cameras; and/or drone locations among other information and can send the collected information to the remote server 24 for processing, analysis, and/or storage. In some embodiments, the remote server 24 can separately process, analyze, and store the data received from the ACABATS observatory 22 based on a type of the data. For example, the video storage server can store the still and/or video footage; the location log server can process, analyze, and store the GPS and/or RFID information; the video processing server can process the still and/or video footage and, in some embodiments, can integrate the still and/or video footage with the GPS and/or RFID information such that each location data point can include still and/or video footage of the relevant location at the time instance the data point was collected; the ACABATS archiver can back up the data in each of the other server/components as well as the configuration data from the ACABATS system 20; and the employee time server can process the GPS and/or RFID information to determine employee time spent on the job.

The various components and/or servers that combine to form the backend server 36 can, either automatically or in response to user input from the third party device 32, produce a report documenting the data collected by the ACABATS observatory 22. In some embodiments, the report can include data documenting the total number of individuals/minority firms/companies and individuals registered as "RPP" and/or "community labor workforce" employees (or other minority/disadvantaged certification/identification) that are working at a given time in comparison to how many such firms/companies and individuals are required to be working at a given time to meet specified requirements (e.g. specific government regulations). In some embodiments, the report can include recommendations for redeploying employees, contactors, or firms based on compliance or non-compliance with the specified requirements. The report can also include an overall general statistical productivity data report for all the work performed on a given project on a weekly basis as indicated by the data gathered by the ACABATS observatory 22 and stored on the backend server 36.

In some embodiments the webserver 34 can serve as a web enabled interface for the third party device 32 to access data and perform functions on the backend server 36. For example, as seen in FIG. 2, the web server 34 can recall the combined location and video data from the backend server based on a request from the third party device 32.

The ACABATS system 20 as described herein can be useful in overcoming many of the challenges present in monitoring constructions sites. For example, the ACABATS system 20 can allow for constructions site managers, business owners, and other authorized users that subscribe to the system to derive a complete picture of the ongoing work at a construction or similar worksite site through direct monitoring of the site in pictures and/or video images from fixed or drone mounted cameras, location data of workers and equipment assets, and detailed reports compiling all of the data alongside known demographic information for workers or others present at the worksite. Some or all of the data can be requested on demand by the site managers, business owners, and other authorized users to allow for comprehensive real-time monitoring of the worksite. Such real-time comprehensive monitoring is not typically available in the field and allows the system to quickly diagnose and correct problems to save time and money. Additionally, the incorporation of demographic information into the detailed reports of the work site activity can be used to document compliance with federal, state, or local regulations that mandate a specific proportion of minority or disadvantaged populations be included as workers for certain projects. The detailed reports can also be used to identify non-compliance with such regulations and can suggest appropriate corrective action to bring the work site back into compliance. In some embodiments, the site managers, business owners, and other authorized users can set up the system to forward a compliance report directly to the government body which simplifies compliance monitoring and provides the government body better assurance that the legal requirements are being met.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
    a local control unit deployed proximate to a secured area;
    a remote server removed from the secured area that communicates with the local control unit over a wide area network;
    a plurality of surveillance devices deployed within the secured area that capture real-time surveillance data and transmit the real-time surveillance data to the local control unit; and
    at least one location tracker that generates first location data indicative of a location of the at least one location tracker within the secured area over a period of time using a first tracking mode,
    wherein the at least one location tracker transmits the first location data and an identifier of the location tracker to the local control unit,
    wherein the local control unit forwards the real-time surveillance data, the first location data, and the identifier of the location tracker to the remote server for storage, analysis, and processing,
    wherein the location tracker is a dual mode location tracker that generates the first location data using the first tracking mode and generates second location data indicative of the location of the at least one location tracker within the secured area over the period of time using a second tracking mode, and
    wherein the first tracking mode continuously monitors and records the location of the of the at least location tracker during the period of time and the second tracking mode periodically monitors and records the location of the at least one location tracker when, during the period of time, the at least location tracker is within range of a tracking beacon located at a known fixed location within the secured area.

2. The system of claim 1 wherein the first location data includes GPS data and the second location data includes RFID activation data at a tracking beacon located at a known fixed location within the secured area.

3. The system of claim 1 wherein the local control unit establishes a secured channel to the remote server over the wide area network and forwards the surveillance data through the secured channel.

4. The system of claim 1 wherein the first tracking mode is emulated by an application running on a mobile device.

5. The system of claim 1 wherein the local control unit directly streams the real-time surveillance data from a selected group of the plurality of surveillance devices to an authorized third party device in response to a request including an indication of the selected group from the authorized third party device.

6. The system of claim 1 wherein the real-time surveillance data includes one of live video or periodic still images.

7. The system of claim 1 wherein the remote server integrates the first location data with portions of the real-time surveillance data captured at the location of the at least one location tracker over the period of time.

8. The system of claim 1 wherein a first group of the plurality of surveillance devices include first cameras mounted on drones that patrol the secured area and a second group of the plurality of surveillance devices include second cameras mounted at fixed locations throughout the secured area.

9. The system of claim 1 wherein the remote server generates a report documenting the location of the at least one location tracker over the period of time in response to received user input.

10. The system of claim 9 wherein the remote server retrieves, from a database of the remote server, demographic information of an assigned user of at least one location tracker using the identifier of the location tracker and incorporates the demographic information in the report.

11. The system of claim 1 wherein the remote server includes a web server for interfacing with a third party device and at least one backend server that stores, analyzes, and processes the real-time surveillance data, the first location data, and the second location data, wherein the web server is isolated from the at least one backend server by a firewall.

12. The system of claim 1 wherein the local control unit sets a boundary of the secured area based on user input received by the local control unit, and wherein the local control unit directs each of the plurality of surveillance devices to capture the real-time surveillance data within the boundary of the secured area.

13. A method comprising:
capturing real-time surveillance data with a plurality of surveillance devices deployed in a secured area;
transmitting the real-time surveillance data to a local control unit proximate to the secured area;
at least one location tracker generating first location data indicative of a location of the at least one location tracker within the secured area over a period of time using a first tracking mode, the first tracking mode continuously monitoring and recording the location of the of the at least one location tracker during the period of time;
the at least one location tracker generating second location data indicative of the location of the at least one location tracker within the secured area over the period of time using a second tracking mode, the second tracking mode periodically monitoring and recording the location of the at least one location tracker when, during the period of time, the at least one location tracker is within range of a tracking beacon located at a known fixed location within the secured area;
the at least one location tracker transmitting the first location data and an identifier of the at least one location tracker to the local control unit;
the local control unit forwarding, over a wide area network, the real-time surveillance data, the first location data, and the identifier of the at least one location tracker to a remote server for storage, analysis, and processing, the remote server including a web server for interfacing with a third party device and at least one backend server isolated from the web server by a firewall; and
the backend server storing, analyzing, and processing the real-time surveillance data and the first location data.

14. The method of claim 13 wherein
the first location data includes GPS data and the second location data includes RFID activation data.

15. The method of claim 13 further comprising emulating the first tracking mode with an application running on a mobile device.

16. The method of claim 13 further comprising the local control unit directly streaming the real-time surveillance data from a selected group of the plurality of surveillance devices to an authorized third party device in response to a request including an indication of the selected group of the plurality of surveillance devices from the authorized third party device.

17. The method of claim 13 further comprising the backend server integrating the first location data with portions of the real-time surveillance data captured at the location of the at least one location tracker over the period of time.

18. The method of claim 13 further comprising the backend server generating a report documenting the location of the at least one location tracker over the period of time in response to receiving user input requesting the report.

19. The method of claim 18 further comprising:
the backend server retrieving demographic information of an assigned user of the at least location tracker from a database of the backend server using the identifier of the at least one location tracker; and
the backend server incorporating the demographic information in the report.

* * * * *